March 23, 1954  J. L. SEIDERS  2,672,710
PLANT PROPAGATION
Filed April 11, 1950
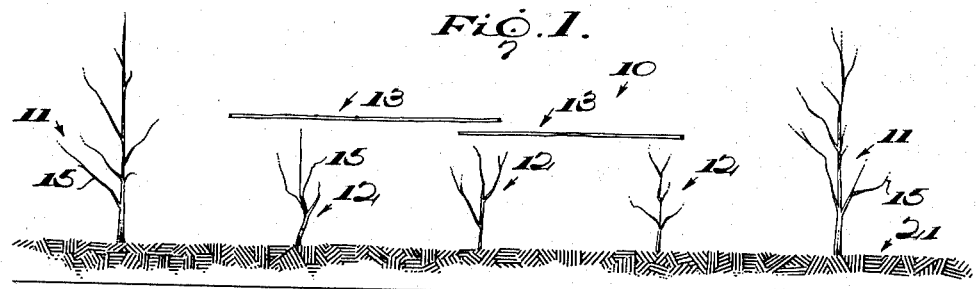
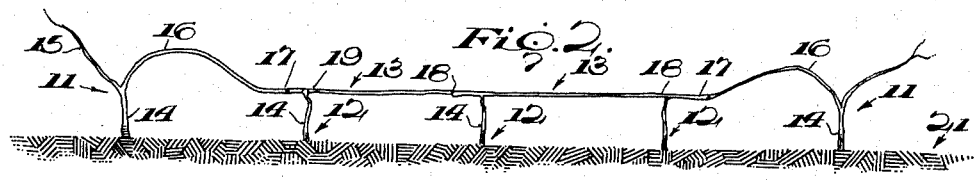
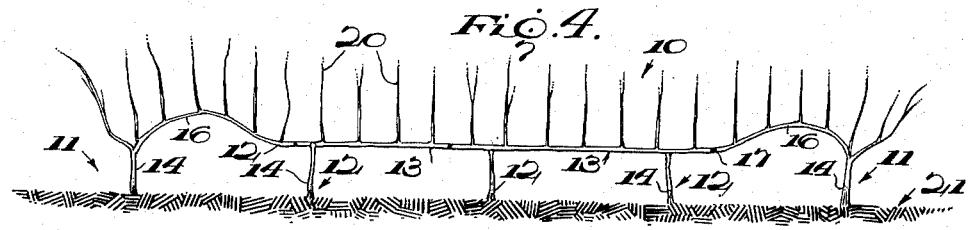
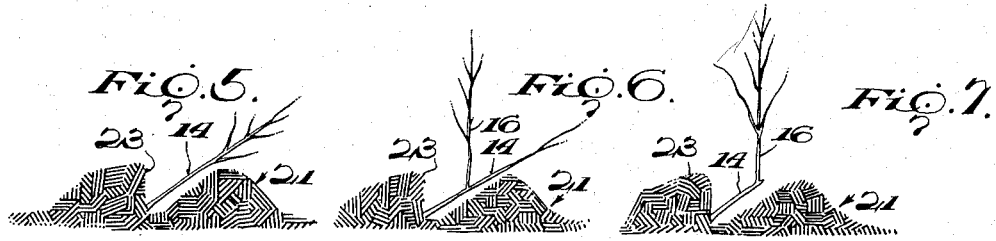
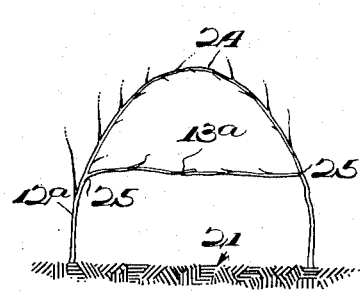
INVENTOR
John L. Seiders.
BY
ATTORNEY Patented Mar. 23, 1954

2,672,710

UNITED STATES PATENT OFFICE 2,672,710

PLANT PROPAGATION

John Leslie Seiders, Woodward, Iowa

Application April 11, 1950, Serial No. 155,298

3 Claims. (Cl. 47—6)

This invention relates to improvements in methods of propagating compound trees and plants and to the improved compound trees and plants obtained thereby, the primary object of the invention being to provide compound trees or plants whose fruiting or blooming branches have their origin on extensor branches which occupy horizontal positions on levels which are close to the ground and at substantially lower levels than is the case with ordinary trees and plants, whereby the operations of fruit or blossom harvesting, pruning, spraying, and repair in case of injury, are greatly facilitated and rendered less expensive and time-consuming, and the trees and plants can be readily prevented from reaching above the desired heights.

Another important object of the invention is to provide trees and plants of the character indicated above having greater structural strength to resist windstorm damage, and whose low profile and lack of underlying branches prevent or reduce bruising of wind-fallen fruit, and to which additional feeder trunks can be added or removed when desired.

Another important object of the invention is to provide a method of obtaining trees of the character indicated above which are younger bearing and having substantially longer than normal life by means of training and grafting together of selected tree components, resulting in two or more rooted feeder trunks having one or more lateral extensor branches grafted to lateral extensor branches of adjacent feeder trunks, from which grafted extensor branches the fruiting or blooming branches grow.

Another important object of the invention is to provide compound trees of the character indicated above wherein young Malling compound root stock trees can be utilized for the feeder trunks without incurring undesirable rooting of the upper sections of the young root stock, since in the formation of the instant compound trees deep planting of the root stock trees which results in such unwanted rooting is unnecessary, and shallow planted young root stock trees are adequately supported without staking and tying of the young root stock trees.

Other important objects and advantageous features of the invention will be apparent from the following description and the accompanying drawings, wherein, merely for purposes of illustration, specific embodiments of the invention are set forth in detail.

In the drawings, wherein like numerals designate like parts throughout the several views:

Fig. 1 is a side elevation, partly in section, showing young trees planted in the ground to provide feeder trunks, and horizontal branches positioned to be grafted to lateral extensor branches on the planted trees;

Fig. 2 is a similar view showing the planted trees pruned to proper form and the horizontal branches grafted in place;

Fig. 3 is a top plan view of Fig. 2;

Fig. 4 is a view similar to Fig. 2 showing growth of fruiting or blooming branches on the grafted extensor branches;

Fig. 5 is an enlarged side elevation, partly in section, showing a young grafted nursery stock tree planted at an angle to grow an extensor branch vertically therefrom;

Fig. 6 is a view similar to Fig. 5, showing the extensor branch grown;

Fig. 7 is a view similar to Fig. 6 showing the completed tree ready for planting to constitute a feeder trunk and a lateral extensor branch;

Fig. 8 is a similar view showing the same tree planted as a component of a compound tree, and Fig. 9 is a side elevation, partly in section, showing another form of compound tree or plant, involving two tall slender trees grafted together at their upper ends and tied together by grafting a cross member at their middle heights.

Referring to Figs. 1–4 of the drawings, the numeral 10 generally designates a compound tree in accordance with the present invention, composed of two end trees or plants, 11, 11, a desired number of intermediate trees or plants 12, and the proper number of connecting or splicing branches 13.

The end trees 11 are preferably larger than the intermediate trees 12 and are preferably, in the case of fruit trees, three-year-old root stocks. The end trees 11 are planted at the desired distance apart and the intermediate trees 12 are planted at equally spaced distances on a line between the end trees 11. The intermediate trees 12 are preferably one-year root stock. The planted trees 11 and 12 then constitute feeder trunks 14.

The branches or shoots 15 on the trees 11 and 12 are then pruned off, except for single branches 16, herein called extensor branches, on the inward sides of the end trees 11. These extensor branches may be constituted by lateral branches left on the end trees or by portions of the upper part of the end trees grown or bent inwardly into horizontal positions, as shown in Figs. 9, 8 and 2.

The connecting branches 13, which are preferably specially grown slender tree limbs of the same variety as the end trees 11, are then put in horizontal positions between the intermediate trees 12 and between the intermediate trees and the adjacent end trees 11. The extensor branches 16 of the end trees 11 are then grafted at 17 to the near ends of the adjacent connecting branches 11, and the other connecting branches 13 are grafted to each other at 18 and to the intermediate trees 12 at 19. In effect the grafted horizontal connecting branches 13 serve as extensor branches like the extensor branches 16 of the end trees 11, and the shoots 20 which grow therefrom, as shown in Fig. 4, become the fruiting and/or blooming branches. The trees are preferably proportioned so that the horizontal extensor branches on which the vertical fruiting branches grow are from six to eight inches above the ground 21 in which the trees are planted.

It will be understood that different varieties of nursery and other root stocks may be employed to obtain special effects. It will also be understood that the feeder trunks can be planted in a straight line, as shown in the drawings, or in any other regular or irregular outlines, and that the relative heights of the end and intermediate trees can be varied and angularity of the extensor branches changed to form other desired ornamental profiles.

Figs. 5–8 of the drawings show a method of preparing a feeder trunk 14 having an integral lateral extensor branch 16. A rooted one-year grafted tree is planted at an extremely slanted angle in the side 22 of an earth mound 23, as shown in Fig. 5 and permitted to grow a vertical shoot, as shown in Fig. 6. Upon further maturity of the shoot, the tree beyond the shoot is pruned off, as shown in Fig. 7, and the trunk 14 is then planted upright in the ground 21 with the extensor branch 16 extending substantially parallel to the ground 21. The trees thus produced can be substituted for the end trees and intermediate trees and splicing branches of the arrangement of Figs. 1–4.

In Fig. 9 is shown another form of the invention, involving two laterally spaced, tall slender trees or bushes 12a, such as hybrid cherries or plums. Their upper ends are bent toward each other and grafted together, as indicated at 24. Then a horizontal splice piece 13a is grafted at its ends to the trees 12a at points 25 midway their upper and lower ends.

It will be observed from the foregoing that the method of the present invention consists essentially in providing two or more root systems above the ground with at least one part of each tied to another by grafted means forming with the parts a horizontal extensor trunk between the root systems. The compound tree formed by this method can be added to and extended in any direction by the addition of more root systems. It is to be understood that an essential aspect of the method is the growth training of young trees, such as nursery stock, to provide the necessary extensor part or parts, in advance of planting of the young trees and grafting of the extensors to form the compound tree. The connecting branches or splicing pieces can be treated and/or grafted to the feeder trunk extensors to provide angular or round arches and other ornamental shapes.

What I claim is:

1. A method of propagating comprising growth training young root stock to provide rooted feeder trunks each having a laterally projecting extensor branch, planting at least two of the feeder trunks in the ground in laterally spaced relation with the trunks in vertical positions and the extensor branches in generally horizontal positions and directed toward each other, and connecting the extensor branches by grafting to produce trunk lines from which vertical fruiting or blossoming shoots can grow, the said connecting being done by grafting splicing pieces to and between the extensor branches.

2. A method of forming a compound tree comprising providing a pair of end feeder tree trunks having laterally projecting extensor branches, planting the feed trunks in the ground at a substantial distance apart with the extensor branches extending horizontally toward each other, planting in the ground at least one younger tree trunk in spaced relation between the end feeder trunks to provide an intermediate feeder trunk, then grafting the extensor branches to the intermediate feeder trunk by grafting splicing pieces to and between the inward ends of the extensor branches and the intermediate feeder trunk.

3. A method of propagating comprising growth training young root stock to provide rooted feeder trunks each having a laterally projecting extensor branch, planting at least two of the feeder trunks in the ground in laterally spaced relation with the trunks in vertical positions and the extensor branches in generally horizontal positions and directed toward each other, connecting the extensor branches by grafting to produce trunk lines from which vertical fruiting or blossoming shoots can grow, said grafted means comprising at least one intermediate feeder trunk planted in the ground in spaced relation between the end trees, and grafted elements connecting the inward ends of the end tree extensor branches with the intermediate feeder trunk, said grafted elements consisting of splicing pieces.

JOHN LESLIE SEIDERS.

References Cited in the file of this patent

UNITED STATES PATENTS

| Number  | Name    | Date          |
|---------|---------|---------------|
| 203,545 | Jenkins | May 14, 1878  |
| 204,197 | Childs  | May 28, 1878  |
| 418,308 | Burgher | Dec. 31, 1889 |
| 418,593 | Smith   | Dec. 31, 1889 |

FOREIGN PATENTS

| Number  | Country        | Date           |
|---------|----------------|----------------|
| 52,387  | Czechoslovakia | Oct. 10, 1935  |
| 386,940 | Germany        | Dec. 21, 1923  |
| 459,996 | Germany        | May 18, 1928   |
| 508,516 | Germany        | Sept. 30, 1930 |
| 554,735 | Germany        | July 12, 1932  |

OTHER REFERENCES

Baltet: "Grafting and Budding," published 1879 in London, England, pp. 40 and 58 through 64.

Baltet: "L'Art de Greffer," published 1907 in Paris, France; 8th ed., pp. 89, 90.

Loudon: "Encyclopaedia of Gardening," published 1834 in England, pp. 648, 649.

Thouin: "Monographie des Greffes," published before October 11, 1884, at Paris, France; by Roret, as Manuels-Roret 135; plates 2 and 5, pp. 17, 34, 35, 36, 37.